United States Patent Office 3,102,049
Patented Aug. 27, 1963

3,102,049
PROCESS OF COATING THE EXTERIOR SURFACE OF A FLUORESCENT LAMP ENVELOPE WITH SILICONE RESINS
Robert F. Quirk, Danvers, Mass., assignor to Sylvania Electric Products Inc., a corporation of Massachusetts
No Drawing. Filed Mar. 16, 1960, Ser. No. 15,263
3 Claims. (Cl. 117—94)

This invention relates to a novel composition for use in coating the external surface of electric discharge type lamps, particularly fluorescent lamps. Specifically the invention relates to the art of depositing a water-repellent film on the external surface of a rapid start type of lamp.

It has been determined that external surface moisture tends to cause a leakage of electrons through the length of the glass envelope and it is thus desirable to reduce the condensation of this moisture. Such reduction is particularly desirable in the rapid start type of lamp where leakage tends to prevent starting of the lamp. It has been found that even high atmospheric humidity will cause this condensation and the ensuing detrimental results.

It is known that the leakage could be reduced by coating the external surface of the glass envelope with a water repellent material. Generally, a silicone or silane has been used for this purpose.

In general, the prior art has utilized either of two procedures to eliminate the problem of condensed moisture. The first procedure involves reacting a silane, for example methyltrichlorosilane or ethyl trichlorosilane, in the vapor phase with a source of hydroxyl groups or the silane has been reacted with absorbed water on the glass surface. The second procedure involves applying a thin film of polysiloxane, such as dimethylpolysiloxane, to the glass surface from a solvent batch. In both of these procedures the glass surface was made more water repellent.

The first procedure has the disadvantage that one of the products of the chemical reaction involved is hydrogen chloride, a very corrosive gas. Lamps to which a water-repellent surface coating is applied by this method are normally processed in an area away from lamp producing machinery so that the corrosive hydrogen chloride can be effectively removed from the atmosphere without coming in contact with the machinery. Where high speed fluorescent lamp producing machinery is involved, this procedure results in excessive handling of the lamps and is economically unfeasible. Further, if machinery for applying the water repellent film to the glass surface were integrated with the high speed lamp producing machinery, elaborate equipment would be required to effectively eliminate the contact of the corrosive hydrogen chloride gas with the exposed metal parts of the lamp producing machinery.

The second procedure for applying the water repellent film to the glass envelope can be integrated with high speed lamp producing machinery; however, the film obtained is degraded with time to such an extent that much of the water repellency is lost prior to the failure of the lamp. The degradation is probably caused by autoxidation of the silicone film.

It is the object of my invention to coat the external surface of glass envelopes with a mixture of silicones which will maintain a high degree of water repellency over the effective life of the lamp.

It is a further object of my invention to provide a method of depositing this film which is amenable to high speed fluorescent lamp production equipment by using a fast drying solvent and by employing chemicals which are not corrosive or do not liberate corrosive gases as a by-product.

It is a further object of this invention to provide a water repellent film for use on the external surface of the fluorescent lamp which retains neither dust nor dirt, nor is tacky.

In an attempt to develop a method of depositing a water repellent film on the external surface of the glass envelope of fluorescent lamps and avoid the disadvantages of the processes mentioned above, I have discovered that a film of a polysiloxane fluid together with a silicone resin will impart improved water repellency to the glass surface for a longer period of time than heretofore possible.

When using these ingredients no adverse effects occur such as the liberation of corrosive gases. Instead, these ingredients impart a highly water repellent film to the glass surface which maintains the water repellency for a longer period of time than is possible with a film consisting of only a polysiloxane.

Without limiting the claims the following example is cited for illustrative purposes.

To 7.57 liters of isopropyl acetate, add 200 mls. of dimethylpolysiloxane and 150 mls. of silicone resin. The mixture should be stirred until all of the dimethylpolysiloxane and silicone resin is dissolved. This solution should then be stirred slowly into 182 liters of isopropyl alcohol and the agitation continued until the resulting mixture is completely and uniformly dispersed.

As a source of the dimethylpolysiloxane, it is preferred to use Dow Corning DC 200 fluid. This fluid comes in various viscosity grades and although the 350 centistokes grade is preferred, viscosities from 20 centistokes to 12,500 may be used successfully. Dow Corning DC 200 fluid is produced by the Dow Corning Corporation and is composed of dimethylsiloxane units. The viscosity is a function of the length of the molecular chains, increasing with increasing molecular chain length. The preferred 350 centistoke viscosity grade has a freezing point of −50° C. and a boiling point at less than 2 mm. Hg of 200° C. The specific gravity at 25° C./25° C. is 0.972 and the resin has a refractive index at 25° C. of 1.4032.

The silicone resin that is preferred is the Dow Corning Silicone Resin Z920 manufactured by the Dow Corning Corporation. This silicone resin is partially alkoxylated resin with the alkoxyl groups predominantly methoxyl. Methods generally available for preparing the Z920 resin include reacting $CH_3Cl$ and Si in the presence of a copper catalyst at temperatures of 200 to 500° C. and separating from the reaction product all of the by-products having a boiling point above that of $(CH_3)_2SiCl_2$. The by-products are then alkoxylated in an amount equivalent to at least 30 molar percent of the hydrolyzable chloride present in the by-product mixture with a primary or secondary alkyl monohydric alcohol having from 1 to 4 carbon atoms. The alkoxylated product is then hydrolyzed by contact with water in quantities at least equivalent to the molar difference between the hydrolyzable chloride in the original mixture of the by-products and the amount of alcohol used, but insufficient to hydrolyze more than 70 molar percent of the total hydrolyzable groups present. Hydrolyzation with these quantities of water produces a partially alkoxylated organopolysiloxane which is 20 to 50 percent by weight alkoxyl. When desired to extend the coverage of the resin, it may be diluted with conventional solvents such as xylene or possibly toluene or mineral spirits. When using xylene, the diluted mixture should contain about 15 percent by weight solvent. Z920 has a viscosity at 25° C. of 10 to 100 centistokes, a specific gravity at 25° C. of 1.05 to 1.15 and the color of light straw.

The above described coating solution is utilized by placing a suitable portion in a batch and the fluorescent lamps to which the water repellent film is to be applied are rolled through the solution in such a way as to cause the lamps to make one complete revolution, thereby covering the entire external surface of the glass envelope. Guide bars are placed in the solution at a depth of about ¼ inch below the liquid so that the ends of the lamp and those parts of the lamp which will be employed in making electrical contacts will not be coated.

The degree of water repellency of various compositions was measured by ascertaining the "contact angle" between a glass surface and a drop of distilled water placed thereon. This measurement is easily made with a protractor.

The test procedure employed in these tests was as follows. The glass used was soda-lime glass, the ingredients comprising approximately 73.6% SiO, 16% $Na_2O$, .6% $K_2O$, 1.0% $Al_2O_3$, 5.2% CaO and 3.6% MgO, in 6 to 7 inch lengths. The glass, after sectioning, was washed in warm tap water to remove surface dirt and then air dried. Silicone solutions were prepared and coated by dipping. The samples were then air dried in mildly warm air while standing on end. The water drop contact angle was measured. The samples were irradiated with ultraviolet light (quartz transmission region) from a high pressure mercury arc. The samples were arranged parallel to the quartz tube and about 6 inches from it. Sample temperatures were several centigrade degrees higher than ambient. Contact angles were measured after various exposure times to determine the rate of degradation of the silicone film under these conditions. The various silicones employed are described in the results.

It will be noted from the foregoing that I have provided a novel coating mixture that imparts improved water repellency to the external surface of the glass envelope of fluorescent lamps. This advantage is accomplished by adding a quantity of a silicone resin such as Dow Corning type Z920 resin to a dimethylpolysiloxane fluid such as Dow Corning DC200 (350 centistokes viscosity grade) in an appropriate ratio. The disadvantages accompanying the prior water repellent film forming materials are eliminated. Further, this novel coating material is amenable to use on high speed fluorescent lamp producing machinery. Still further, this novel water repellent film forming material provides a film which is not tacky and therefore does not cause dirt or dust to cling to the lamp surface.

What I claim is:

1. A process for coating the external surface of an electric discharge lamp, the steps comprising: forming a composition consisting of a solvent, dimethylpolysiloxane and a partially alkoxylated silicone resin, said dimethylpolysiloxane and said silicone resin each comprising between .05% and .4% by volume of said composition and coating the external surface of the lamps by rolling at least one complete revolution in said composition.

2. The process according to claim 1 wherein the solvent is a member selected from the group consisting of petroleum naphthas, acetates, xylene and alcohols.

3. A process for coating the external surface of an electric discharge lamp, the steps comprising: dissolving a

*Table I*

| Treatment (solvent isopropyl alcohol) percent by volume | Contact Angle After Exposure To Quartz Ultraviolet Light, degrees | | | | | | | | | | | | |
|---|---|---|---|---|---|---|---|---|---|---|---|---|---|
| | 0 Hours | 2 Hours | 4 Hours | 5 Hours | 7 Hours | 13 Hours | 15 Hours | 16 Hours | 24 Hours | 29 Hours | 33 Hours | 35 Hours | 40 Hours |
| .075% Z920 | 60 | 85 | 80 | | | | | | | | | | |
| .1% Z920 | 70 | 80 | | | | 45 | | 35 | 25 | | | | 10 |
| .15% Z920 | 60 | 80 | 80 | | | | 15 | | | | 10 | | |
| .1% DC200 | 40 | 20 | | | | | | 45 | 20 | | | | 15 |
| .2% DC200 | 50 | 85 | | | 50 | | 20 | | | | 10 | | |
| .3% DC200 | 50 | 85 | | | 85 | | 75 | | | | 50 | | |
| .4% DC200 | 75 | 85 | | | 85 | | 75 | | | | 50 | | |
| .075% Z920 / .1% DC200 | 60 | | | 90 | | 90 | | | | | 80 | | 15 |
| .075% Z920 / .2% DC200 | 70 | | | 85 | | 85 | | | | | 80 | 85 | |
| .075% Z920 / .3% DC200 | 80 | 80 | 90 | | | | | 75 | 90 | | | 80 | 70 |
| .075% Z920 / .4% DC200 | 80 | 80 | 80 | | | | | 90 | 80 | | | | 80 |
| .15% Z920 / .1% DC200 | 60 | 85 | 80 | | | | | 80 | 50 | | | | 20 |
| .15% Z920 / .2% DC200 | 60 | 80 | 90 | | | | | 90 | 75 | | | | 20 |
| .15% Z920 / .3% DC200 | 60 | 85 | 85 | | | | | 90 | 55 | | | | 10 |
| .15% Z920 / .4% DC200 | 60 | 85 | 90 | | | | | 90 | 60 | | | | 3 |

As is apparent from the table, each of the silicone resins (Z920) and the dimethylpolysiloxane (DC200) tends to break down rather rapidly when alone, but when used together the contact angle (that is, the degree of water repellency) is substantially greater.

The solvent for the silicone resin and the dimethylpolysiloxane may be selected from solvents such as petroleum naphthas, acetates, xylene or alcohols, the alcohols being for example methyl, ethyl, propyl and isopropyl. The solvent should evaporate readily and be miscible with the silicone resin. If continuous agitation is employed, a solvent may be utilized which gives an emulsoid.

It has been determined that the film forming materials may be varied over the range of 0.05 to 0.4 ml. of each water repellent material per 100 mls. of solvent; that is, .05% to .4% by volume. Going below this lower limit reduces the water repelling while going above the upper limit yields a tacky film. Optimum concentrations for improved water repellency, a non-tacky film and economy were found to be 0.075% resin and 0.1% dimethylpolysiloxane.

partially alkoxylated silicone resin with the alkoxyl groups predominantly methoxyl and dimethylpolysiloxane in a minor amount of isopropyl acetate solvent, mixing this mixture with a sufficient volume of isopropyl alcohol to produce a mixture wherein each of the dimethylpolysiloxane and the silicone resin is in a volume ratio of .05% to .4% with the solvent, then coating the external surface of the lamps by rolling at least one revolution in the mixture.

References Cited in the file of this patent

UNITED STATES PATENTS

| 2,148,558 | Huebner | Feb. 28, 1939 |
| 2,588,393 | Kauppi | Mar. 11, 1952 |
| 2,698,817 | Guenther | Jan. 4, 1955 |
| 2,934,235 | Manevi | Apr. 26, 1960 |
| 2,934,519 | Clark | Apr. 26, 1960 |
| 2,955,958 | Brown | Oct. 11, 1960 |

FOREIGN PATENTS

| 466,317 | Canada | July 4, 1950 |
| 807,133 | Great Britain | Jan. 7, 1959 |